United States Patent
Gross et al.

(10) Patent No.: US 9,638,332 B2
(45) Date of Patent: May 2, 2017

(54) VALVE FOR AN EXHAUST SYSTEM OF AN INTERNAL COMBUSTION ENGINE

(71) Applicant: BorgWarner Esslingen GmbH, Esslingen am Neckar (DE)

(72) Inventors: Hans-Ulrich Gross, Leinfelden-Echterdingen (DE); Dirk Michael Strubel, Kernen im Remstal (DE)

(73) Assignee: BorgWarner Esslingen GmbH, Esslingen am Neckar (DE)

( * ) Notice: Subject to any disclaimer, the term of this patent is extended or adjusted under 35 U.S.C. 154(b) by 0 days.

(21) Appl. No.: 15/016,075

(22) Filed: Feb. 4, 2016

(65) Prior Publication Data

US 2016/0281653 A1   Sep. 29, 2016

(30) Foreign Application Priority Data

Mar. 27, 2015 (DE) .................. 10 2015 104 743
Jul. 10, 2015 (DE) .................. 10 2015 111 252

(51) Int. Cl.
| | |
|---|---|
| F16K 11/052 | (2006.01) |
| F16K 1/226 | (2006.01) |
| F02M 26/42 | (2016.01) |
| F02M 26/70 | (2016.01) |
| F02M 26/71 | (2016.01) |

(52) U.S. Cl.
CPC ........... *F16K 1/2261* (2013.01); *F02M 26/42* (2016.02); *F02M 26/70* (2016.02); *F02M 26/71* (2016.02); *F16K 11/0525* (2013.01)

(58) Field of Classification Search
USPC ................. 137/625.18, 625.19; 251/304
See application file for complete search history.

(56) References Cited

U.S. PATENT DOCUMENTS

| | | | | |
|---|---|---|---|---|
| 2,088,632 A | * | 8/1937 | Benjamin | F02M 21/04 137/607 |
| 2,301,428 A | * | 11/1942 | MacNeil | F16K 11/0856 137/375 |
| 3,008,491 A | * | 11/1961 | Riefler | F16K 11/0836 137/625.19 |
| 6,308,739 B1 | * | 10/2001 | Barbuto | F16K 5/0478 137/625.11 |
| 6,609,367 B2 | * | 8/2003 | Nakayasu | F01N 3/28 137/625.19 |
| 7,121,088 B2 | * | 10/2006 | Lavin | F01N 1/166 137/595 |

* cited by examiner

*Primary Examiner* — John Fox
(74) *Attorney, Agent, or Firm* — Hackler Daghighian Martino & Novak

(57) ABSTRACT

A valve for an exhaust system of an internal combustion engine includes a housing which contains a passage for conducting exhaust gases. In the passage is arranged a closing body with which the passage can be closed. The closing body is fastened in a rotationally fixed manner to a shaft, which is mounted rotatably in the housing, and can be pivoted together with the shaft about the rotation axis of the shaft. The closing body has a partition, which runs perpendicularly to the rotation axis of the shaft, and has a circular outer contour which is sealed off from the housing and divides the passage into a first duct and a second duct. When the closing body is in the closed position both the first and second ducts are closed. When the closing body is in an open position the exhaust gasses can pass through the first and second ducts.

13 Claims, 6 Drawing Sheets

Fig. 12

VALVE FOR AN EXHAUST SYSTEM OF AN INTERNAL COMBUSTION ENGINE

CROSS-REFERENCE TO RELATED APPLICATIONS

This application claims priority to DE 10 2015 104 743.8 filed on Mar. 27, 2015 and DE 10 2015 111 252.3 filed on Jul. 10, 2015, the contents of which are fully incorporated herein with these references.

DESCRIPTION

Field of the Invention

The invention proceeds from a valve for an exhaust system of an internal combustion engine, in particular an exhaust gas recirculation valve, having a housing that contains a passage to conduct exhaust gases, a closing body being arranged in the passage, with which closing body the passage can be closed.

Background of the Invention

Exhaust gas recirculation valves are known from widespread use in practice, which have a duct for conducting exhaust gases and a closing body, which is arranged in the duct and has a closed position in which it closes the duct and shuts off the exhaust gas flow. These valves are only suitable for controlling one (1) exhaust gas flow.

In internal combustion engines having a plurality of cylinders, in particular six or more cylinders, it can be advantageous to conduct the exhaust gas flows of a first group of cylinders with a first exhaust manifold into a first duct and the exhaust gas flow of a second group of cylinders via a second exhaust manifold into a second duct. An exhaust gas recirculation valve is known for such an application, which contains two separate ducts in the housing thereof, in each of which ducts a dedicated closing body is situated. The two closing bodies are fastened to a common shaft. The shaft is mounted rotatably in three bearings in the housing, one of the bearings being arranged between the two closing bodies. In addition, there is also a variant in which the two closing bodies are arranged on two shafts, which are coupled to each other and each have two bearings. The two exhaust gas flows are conducted further in separate ducts through an exhaust gas cooler downstream of the exhaust gas recirculation valve.

The known valves that each have two closing bodies arranged on shafts that have three or four bearings are complex in terms of design and production. They have many individual parts, the tolerances of which accumulate and result in unavoidable leakages, which can even increase owing to different thermal expansions during operation. Moreover, the mounting of the shaft on three bearings is hyperstatic, for which reason a relatively large bearing play must be provided to avoid jamming of the shaft. This results in further leakages, in particular also in a leakage flow from one duct into the other duct via the bearing arranged between the two closing bodies.

It may be an object of the present invention to create an improved valve for an exhaust system of an internal combustion engine, through which valve two separate exhaust gas flows can be conducted. This object may be achieved by a valve having the features of the independent claims. Advantageous developments of the invention form the subject matter of the dependent claims.

SUMMARY OF THE INVENTION

The valve according to the invention is designed for an exhaust system of an internal combustion engine having a plurality of cylinders, in which a first exhaust gas flow from a first group of cylinders is conducted separately from a second exhaust gas flow from a second group of cylinders. The valve can in particular be a hot gas exhaust gas recirculation valve, which is designed for an exhaust gas temperature of 700° C. or more, in particular of up to 1050° C. in the case of gasoline engines for cars. The valve contains a housing that has a passage for conducting exhaust gases. In the passage is arranged a closing body, with which the passage can be closed. The closing body is fastened in a rotationally fixed manner to a shaft, which is mounted rotatably in the housing, and can be pivoted together with the shaft about the rotation axis of the shaft. The shaft can be mounted in the housing with two bearings and projects transversely into the passage. A drive device can be coupled to one end of the shaft to pivot the shaft. The closing body has a partition, in particular a partition wall. The partition runs perpendicularly to the rotation axis of the shaft, has a circular outer contour, is sealed off from the housing and divides the passage into a first duct and a second duct separate from the first duct. The closing body has a closed position, in which both ducts are closed. The circular outer contour of the partition can be seen when the closing body is viewed along the rotation axis of the shaft and can in particular be circular-cylindrical. In every position of the closing body, the circular outer contour is sealed off from the housing, so the partition separates the first duct from the second duct when the closing body is in its closed position and when it is in its open positions.

The closing body has a plurality of side faces, which extend substantially in the longitudinal direction of the shaft. In each of the ducts are arranged two of the side faces, of which in each case one first side face faces the upstream section of the respective duct when the closing body is in its closed position, and of which in each case one second side face faces the downstream section of the respective duct when the closing body is in its closed position. The closing body thus separates an upstream section from a downstream section for both ducts when in its closed position. The closing body, in particular in the regions of the closing body in which the side faces are arranged, can act as a flap and can extend parallel to the rotation axis of the shaft in some sections. The closing body can have a circular or elliptical outer contour when viewed transversely to the rotation axis of the shaft. The partition can be arranged approximately centrally on the flap. The closing body can have a one part design with an integrated partition or else a multi part design.

The valve according to the present invention may have (but which are not necessary) substantial advantages:

- The valve makes it possible with only one closing body to conduct two separately supplied exhaust gas flows through the valve separately from each other and to conduct them further separately from each other downstream of the valve.
- The closing body itself ensures that the two exhaust gas flows are kept separate on their way through the valve. At the same time, the amount of exhaust gas flowing through the two ducts can be controlled by one closing body.
- The valve is very compact and needs only a small amount of installation space.
- The production outlay for the valve is low.
- The leakage of the valve is very low, in particular also with the different amounts of thermal expansion of the components of the valve, which occur owing to the high operating temperatures. This applies both to leakage flows from the upstream sections of the ducts into the downstream sections of the ducts when the closing body is in the closed position as well as to a leakage flow between the two ducts.

In particular in comparison with an exhaust gas recirculation valve as described in the introduction, having two parallel flaps on one shaft with three bearing points, the valve structure is greatly simplified and the number of points at which a leak can occur owing to tolerances and/or different thermal expansions during operation is greatly reduced.

Except for the closing body, most parts of the valve can also be used unchanged for a valve variant through which only one exhaust flow is conducted. Therefore, many identical parts can be used for different valve versions, as a result of which in particular the outlay for production and storage is reduced.

In an embodiment of the invention, the closing body can have a bore, in which the shaft sits. The shaft can pass through the bore and be mounted by means of two bearings, in particular sliding bearings, arranged adjacently to the closing body in the housing. At least one suitable sealing element, in particular one suitable for the operating temperature of the valve, can be arranged between the circular outer contour of the partition of the closing body and the housing in order to seal off the first duct from the second duct. A sealing ring can be arranged as the sealing element on the circular outer contour of the partition of the closing body. The sealing ring can be configured as a piston ring having a separation point along its circumference. The closing body can have a groove running around along the partition to receive the sealing ring. However, the sealing ring can also sit in a groove arranged in the housing and bear against a groove-free circular-cylindrical outer face of the partition. The sealing ring can in particular have a larger outer diameter than the closing body.

In a further configuration, the valve can contain a sealing element that has a curved surface on its side facing the closing body, which surface can interact with the circular outer contour of the partition of the closing body or a sealing ring arranged thereon, for example the piston ring. The curved surface of the sealing element can have the shape of a circumferential surface of a circular cylinder or of a segment thereof. The sealing element can be planar, at least on an outer side opposite the curved surface, in particular on all the other outer sides. The thickness of the sealing element—measured parallel to the rotation axis of the shaft—can be somewhat greater than the thickness of the sealing ring. The sealing element can be arranged in the housing, in particular in at least one groove, which is arranged in the housing and extends in the flow direction and transversely to the rotation axis of the shaft, such that said sealing element can be displaced along the passage, in particular transversely to the rotation axis of the shaft. In particular, particularly simple mounting of the closing body in the housing can be ensured thereby. Two sealing elements in the form of sealing bars can be provided, of which each one is arranged in a groove in the housing. The length of the sealing bar can correspond to the length of the housing in the flow direction of the exhaust gas. However, a sealing element in the form of a planar sealing plate with a rectangular outer contour can also be provided. The sealing plate has a circular-cylindrical opening, the diameter of which is matched to the diameter of the circular outer contour of the partition of the closing body, in particular to the diameter of the sealing ring arranged between sealing plate and partition. The sealing plate thus surrounds the partition along the circular outer contour thereof. The sealing plate can have a groove running around its circular-cylindrical opening to receive the sealing ring, in particular the piston ring, which then bears against a groove-free outer contour of the partition of the closing body. A sealing plate can have the advantage that simple mounting and good sealing of the valve is ensured with few individual parts. If production is not so precise, the start and end of a sealing bar can each form an edge that can cause wear on the circular outer contour of the partition or on a sealing ring during operation. The risk that such edges arise can be eliminated by a sealing plate.

In an embodiment, the housing can, in particular in combination with two sealing bars, have a length, measured in the flow direction of the exhaust gas, that is smaller than the diameter of the circular outer contour of the partition of the closing body. The valve can be connected to an inflow flange and/or to an outflow flange, which is/are screw-fastened to the housing. At least one of the flanges has two ducts, which are separated by a partition, in particular a partition wall, the distance of which—measured along the rotation axis of the shaft—from one end of the shaft coincides with the distance of the partition of the closing body from the same end of the shaft. The partition of the closing body and the partition of the flange are thus arranged in alignment with each other in the flow direction of the exhaust gas, so that the exhaust gas flows are disrupted as little as possible. The partition of the flange can have the shape of a segment of a circumferential surface of a circular cylinder on the side of the partition that faces the closing body, in order to seal off there from the circular outer contour of the partition of the closing body, in particular in order to provide a contact face for the sealing ring.

BRIEF DESCRIPTION OF THE DRAWINGS

Further advantages and features of the invention will become more readily apparent from the following description of exemplary embodiments when taken in conjunction with the figures. In the figures:

FIG. 9 shows another perspective view of the assembly of FIG. 1.

DETAILED DESCRIPTION OF THE PREFERRED EMBODIMENTS

FIGS. 1 to 12 show an assembly for an exhaust system of an internal combustion engine, which contains a valve 1, a drive device 2, an inflow flange 4 and an outflow flange 6. The inflow flange 4 contains two ducts 8, 9, which are separated in the inflow flange 4 by a partition 10; see in particular FIG. 5. A pipe can be welded to the inflow flange 4 at each of the ducts 8, 9 in a manner not shown in detail. The internal combustion engine (not shown) can have for example six cylinders. The exhaust gases of a first group of cylinders, for example cylinders 1 to 3, can be supplied to the first duct 8 of the inflow flange 4. The exhaust gases of a second group containing for example cylinders 4 to 6 can be supplied to the second duct 9 of the inflow flange 4.

Figure 12:
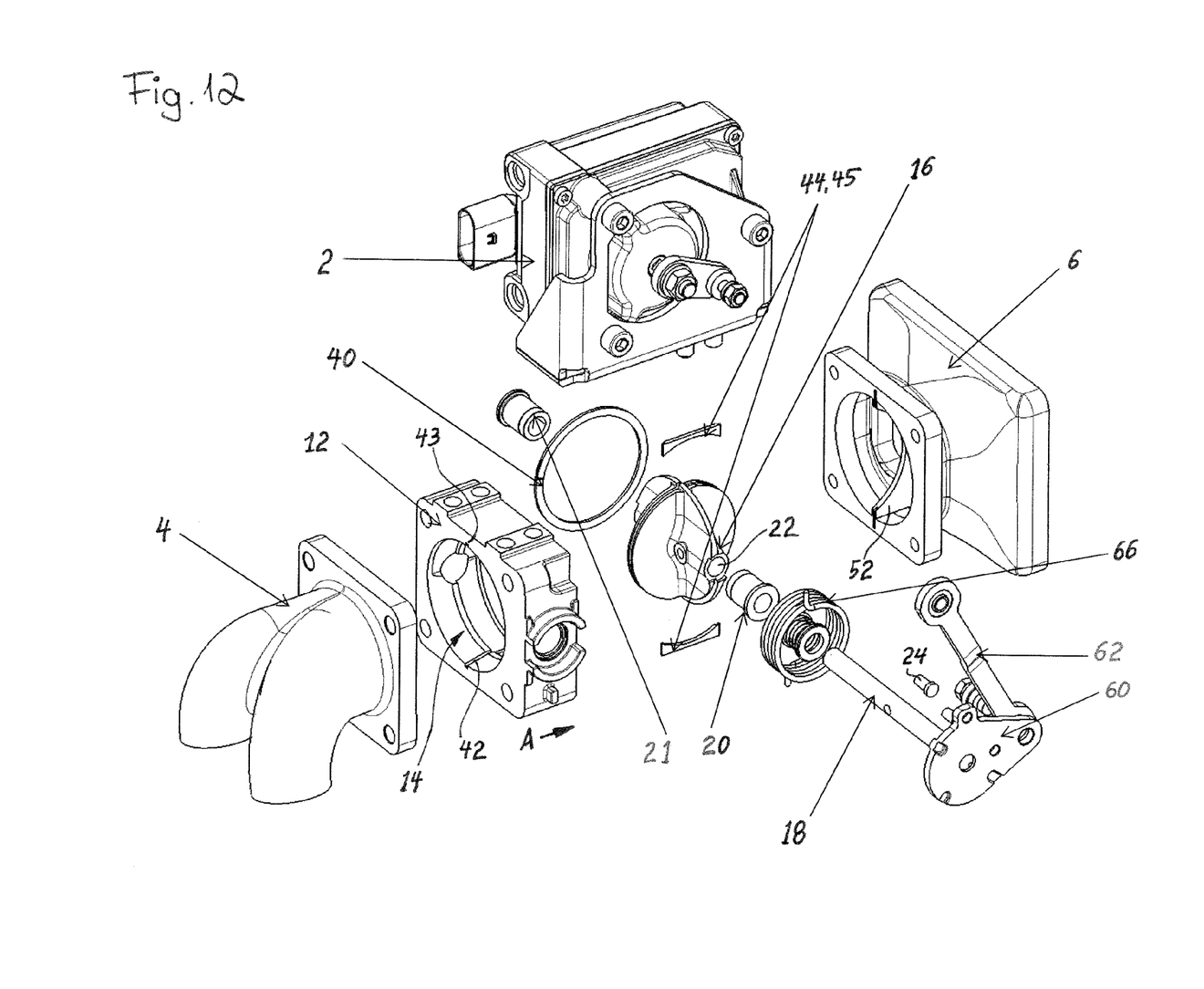
FIG. 12 shows a perspective exploded view of the assembly of FIG. 1.

The valve 1 is a flap-type exhaust gas recirculation valve and contains a housing 12 having a passage 14, through which exhaust gases can flow in flow direction A;

see in particular FIG. 12. In the passage 14 is arranged a closing body 16, with which the passage 14 can be closed. A shaft 18 extends transversely through the passage 14 and is mounted such that it can rotate about a rotation axis 19 in the housing 12 by means of two bearings 20, 21; see in particular FIG. 5. The closing body 16 has a bore 22, in which the shaft 18 sits; see in particular FIGS. 6 and 7. The closing body 16 is connected to the shaft 18 in a rotationally fixed manner by means of a pin 24.

The closing body 16 has a partition 26, which runs perpendicularly to the rotation axis 19. The partition 26 continues the partition 10 and divides the passage 14 into a first duct 28 and a second duct 29; see in particular FIG. 5.

The closing body 16 has a closed position—see in particular FIGS. 2, 5, 6 and 10—in which it closes both ducts 28 and 29. The closing body 16 can be pivoted into an open position, shown in FIG. 11, in which exhaust gas supplied via the duct 8 can flow through the duct 28. Exhaust gas supplied via the duct 9 can flow through the duct 29. In the closed position, the closing body 16 separates an upstream section 30 of the duct 28 from a downstream section 32 of the duct 28 and an upstream section 31 of the duct 29 from a downstream section 33 of the duct 29. To this end, the closing body 16 has a plurality of side faces 34, 35, 36, 37, which extend substantially along the rotation axis 19. The two side faces 34 and 36 are arranged in the duct 28, the side face 34 facing the upstream section 30 and the side face 36 facing the downstream section 32 when the closing body 16 is in the closed position. The side faces 35 and 37 of the closing body 16 are arranged in the duct 29, the side face 35 facing the upstream section 31 and the side face 37 facing the downstream section 33 in the closed position. When the valve 1 is completely open—see FIG. 11—the side faces 34, 35, 36, 37 extend in the flow direction A of the exhaust gas. Viewed transversely to the rotation axis 19, the closing body 16 has a circular outer contour; see in particular FIG. 6. The closing body 16 is formed in one part with an integrated partition 26; see in particular FIG. 5. However, the closing body 16 can also be formed in several parts in a manner not shown, in which a first part of the partition 26 can be attached to the side faces 34, 35 and a second part of the partition 26 can be attached to the side faces 36, 37.

Figure 6:
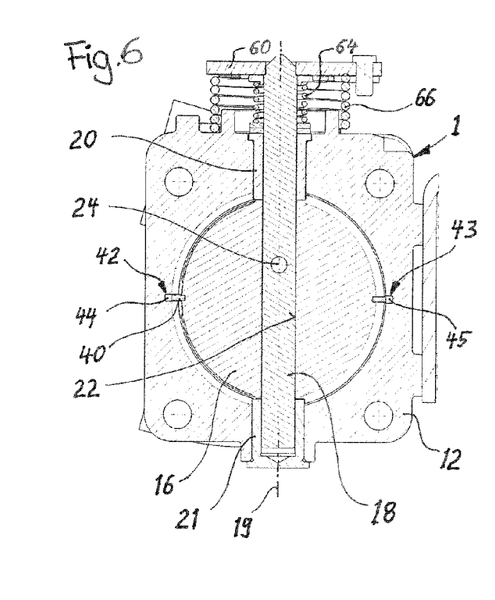
FIG. 6 shows the assembly in a section along sectional plane VI-VI of FIG. 5.
Figure 7:
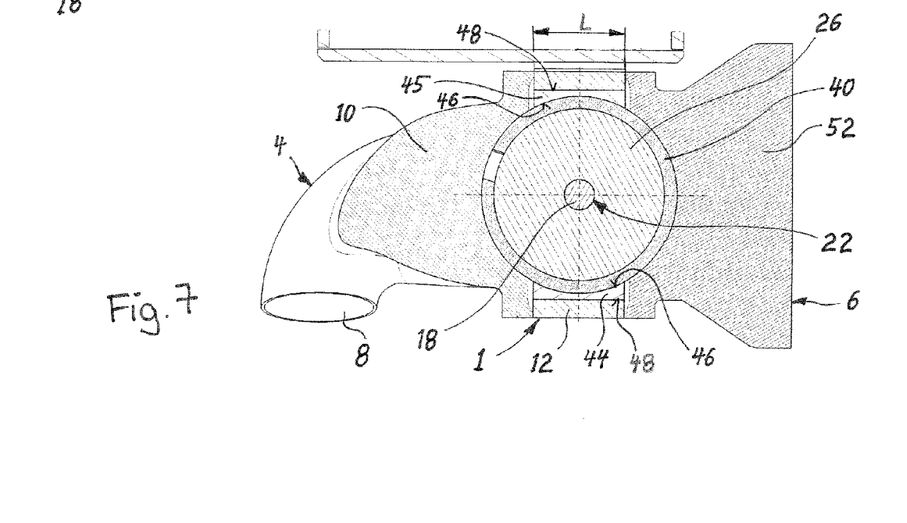
FIG. 7 shows the assembly in a section along sectional plane VII-VII of FIG. 5.
Figure 8:
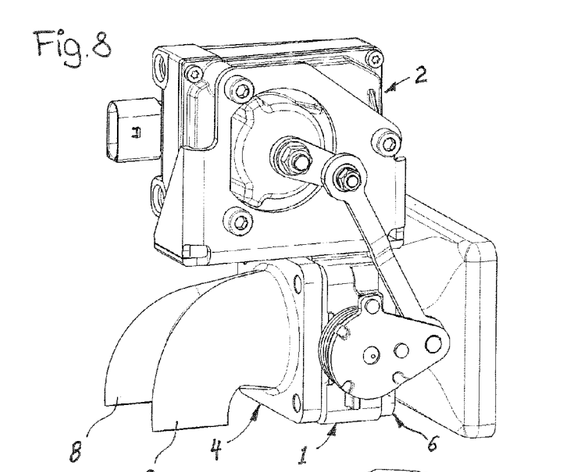
FIG. 8 shows a perspective view of the assembly of FIG. 1.
Figure 10:
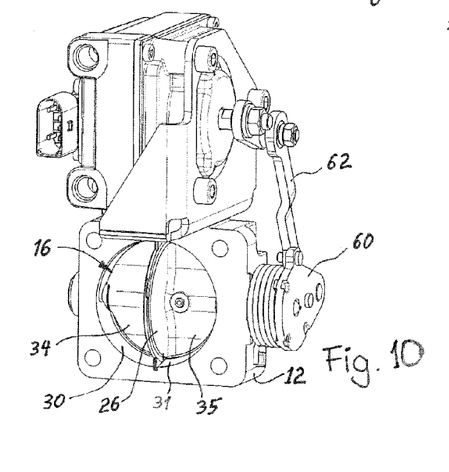
FIG. 10 shows a perspective view of part of the assembly of FIG. 1 with the valve closed.
Figure 11:
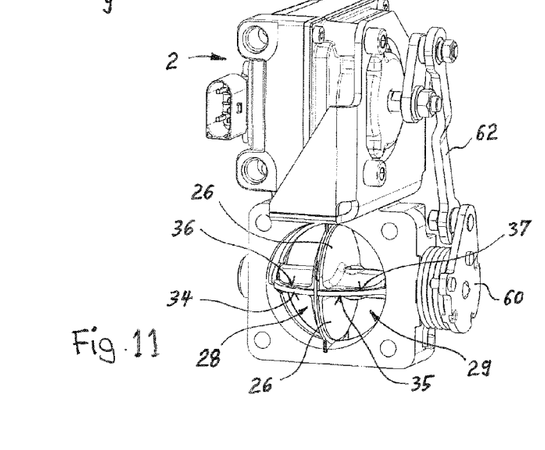
FIG. 11 shows a view corresponding to FIG. 10, in which the valve is open.

Viewed along the rotation axis 19, the partition 26 has a circular outer contour; see in particular FIG. 7. On the circular outer contour of the partition 26 is arranged a sealing element in the form of a sealing ring 40, which is arranged in a groove running around the circular outer contour of the partition 26. The sealing ring 40 runs all the way round in the circumferential direction of the partition 26 except for its separation point, has a greater outer diameter than the closing body 16—see in particular FIGS. 5 and 6—and is in the form of a piston ring.

The housing 12 contains two grooves 42, 43 running transversely to the rotation axis 19 and along the flow direction A; see in particular FIGS. 6 and 12. Two sealing elements 44, 45 in the form of sealing bars are provided, which are arranged displaceably in the grooves 42, 43.

Each of the sealing bars 44, 45 has a curved surface 46, which interacts with the sealing ring 40; see in particular FIG. 7. The curved surfaces 46 have the shape of a segment of a circumferential face of a circular cylinder. Each sealing strip 44, 45 is planar on its other outer sides, in particular the outer side 48 opposite the curved surface 46.

When the valve 1 is assembled—see in particular FIG. 12—the two bearings 20, 21 are inserted into the housing 12 first. The sealing ring 40 is placed onto the closing body 16. Then the sealing bars 44, 45 are placed with their curved surfaces 46 onto the outer circumferential face of the sealing ring 40. The closing body 16 is then pushed into the passage 14 together with the sealing bars 44, 45 along the flow direction A, the sealing bar 44 being introduced into the groove 42 and the sealing bar 45 being introduced into the groove 43. Then the shaft 18 is pushed through the bearing 20 and through the bore 22 in the closing body 16 and into the bearing 21. Then the closing body 16 is fixed to the shaft 18 with the pin 24.

The partition 26 is sealed off from the housing 12 at its circular outer contour by means of the sealing ring 40 and the sealing bars 44, 45. At the same time, the first duct 28 is sealed off from the second duct 29 in the housing 12. The two exhaust gas flows supplied separately into the ducts 8 and 9 can thus also be conducted further through the ducts 28 and 29 separately from each other in the valve 1.

Figure 1:
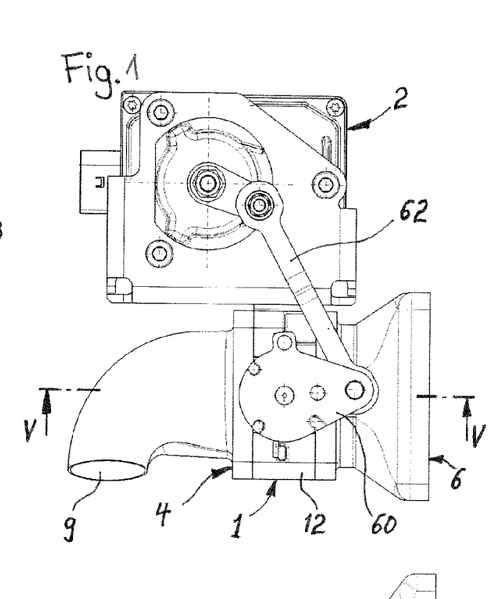
FIG. 1 shows a front view of an assembly having a valve according to the invention for an exhaust system.
Figure 2:
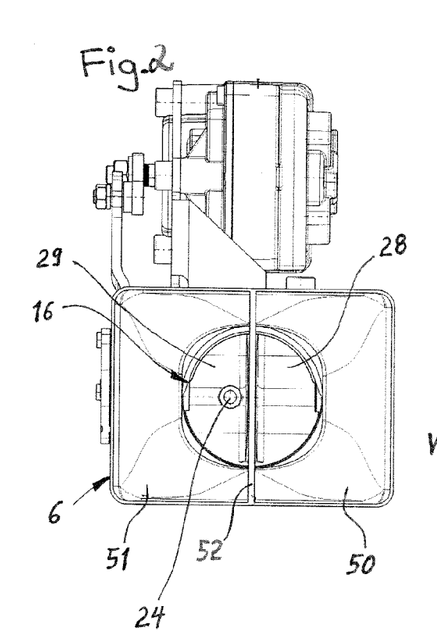
FIG. 2 shows a side view from the right of the assembly of FIG. 1.
Figure 3:
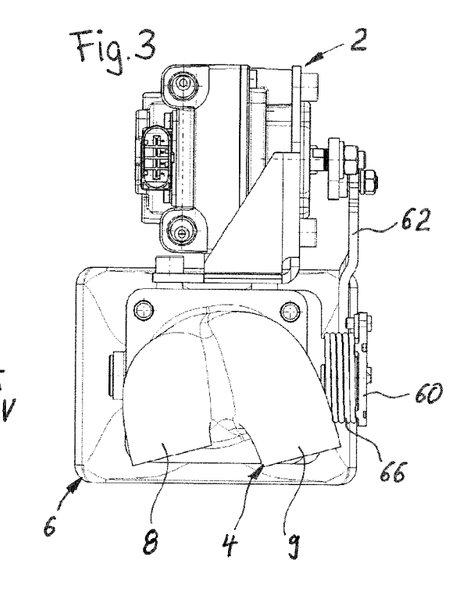
FIG. 3 shows a side view from the left of the assembly of FIG. 1.
Figure 4:
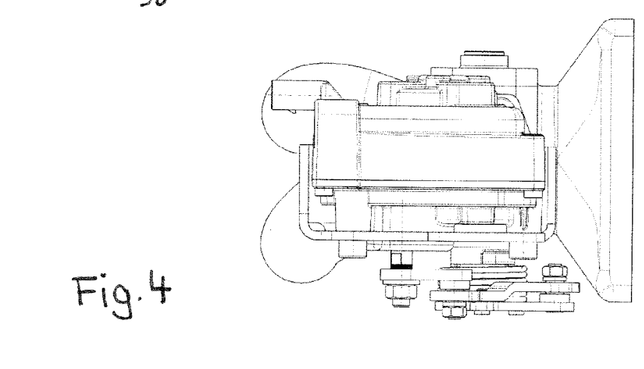
FIG. 4 shows a view from above of the assembly of FIG. 1.
Figure 5:
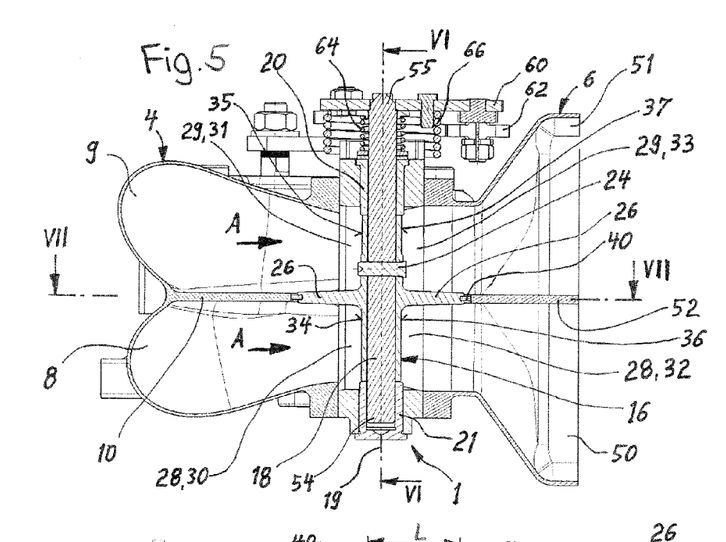
FIG. 5 shows the assembly in a section along sectional plane V-V of FIG. 1.

The outflow flange 6 is screw-fastened to the downstream side of the housing 12, is part of an exhaust gas cooler (not shown) and has two ducts 50 and 51, which are separated by a partition 52. The exhaust gas flows are further conducted separately through the exhaust gas cooler, the exhaust gas flow conducted through the duct 28 of the valve 1 in the duct 50 of the outflow flange 6 and the exhaust gas flow conducted in the duct 29 of the valve 1 through the duct 51 of the outflow flange 6. To allow the least possible disruption to the flow of the exhaust gas, the distance of the partitions 10 and 52—measured along the rotation axis 19—from one end 54 of the shaft 18 correspond to the distance of the partition 26 of the closing body 16 from the same end 54 of the shaft 18. As can be seen in FIG. 5, the partition 10 is thereby continued by the partition 26 aligned therewith, which is then continued in turn by the partition 52.

The housing 12 has a length L, measured in the flow direction A of the exhaust gas, that is smaller than the diameter of the circular outer contour of the partition 26 of the closing body 16; see in particular FIG. 7. The partition 26 therefore projects both into the inflow flange 4 and into the outflow flange 6; see also FIG. 5. To ensure that the first duct 8, 28, 50 is sealed off from the second duct 9, 29, 51 even in the regions of the sections of the partition 26 that project into the flanges 4, 6, the partitions 10 and 52 of the flanges 4 and 6 each have, on their side facing the closing body 16, the shape of a segment of a circumferential surface of a circular cylinder, against which the sealing ring 40 bears in a sealing manner.

A drive lever 60 is fastened in a rotationally fixed manner to the end 55 of the shaft 18 to pivot said shaft. The drive lever 60 is coupled via a coupling member 62 to the drive device 2, which can contain an electrical actuator in a manner that is not shown in detail but is known per se. Between the bearing 20 and the drive lever 60 is arranged a compression spring 64, by means of which the shaft 18 is drawn upwards in the view of FIG. 5, so that the closing body 16 bears tightly against the bearing bushing 20. This ensures a defined position of the closing body 16 in the passage 14. Between the housing 12 and the drive lever 60 is arranged a rotary spring 66, which surrounds the shaft 18 and exerts a torque on the shaft 18, in order to pivot the closing body 16 into its closed position in the event of a failure of the drive 2.

Figure 13:
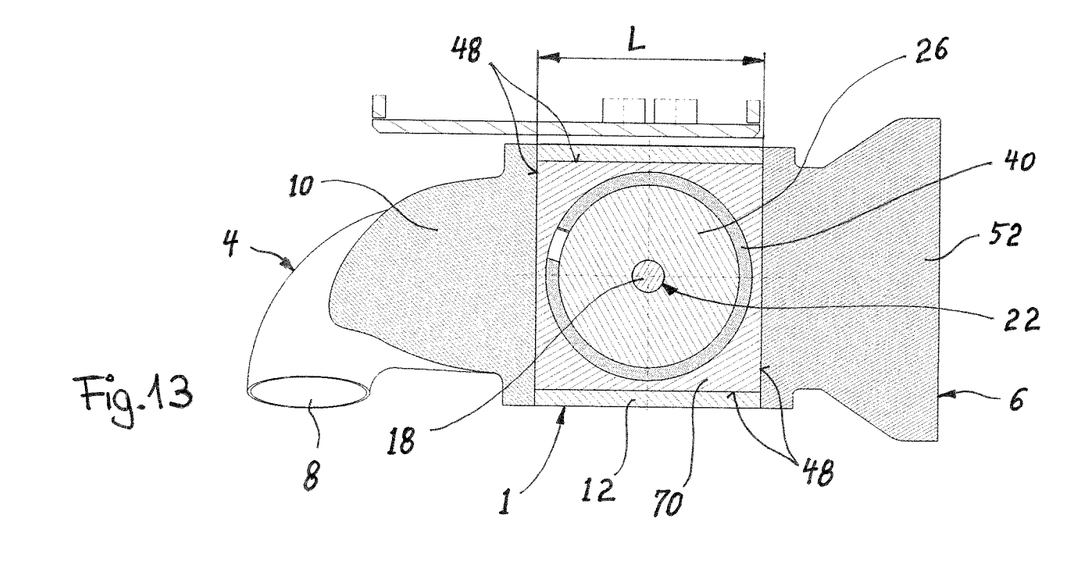
FIG. 13 shows a view corresponding to FIG. 7 of an assembly having a variant of a valve according to the invention.
Figure 14:
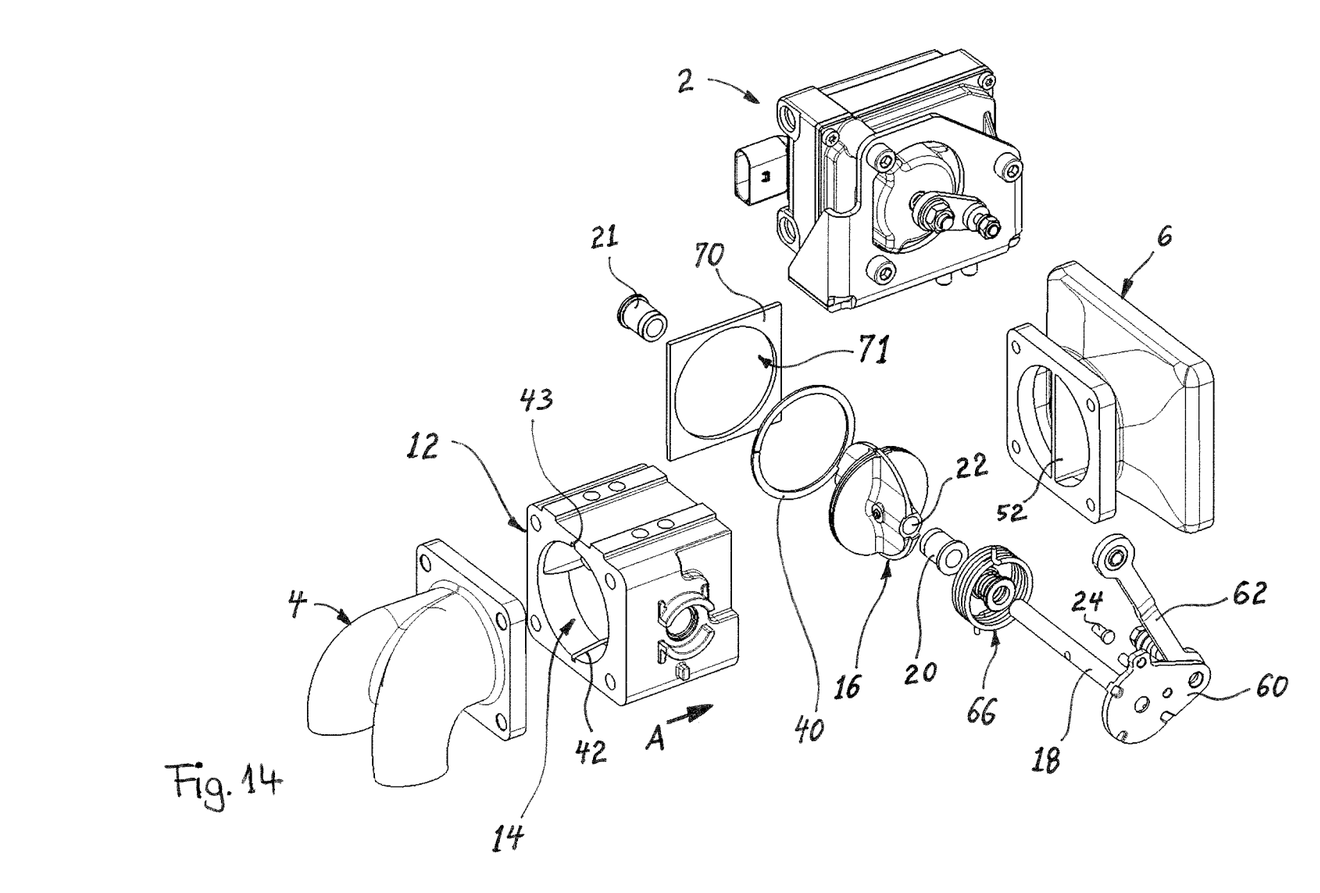
FIG. 14 shows a perspective exploded view of the assembly of FIG. 13.

FIGS. 13 and 14 show another embodiment of an assembly for an exhaust system of an internal combustion engine, in which the sealing off of the closing body 16 from the housing 12 and from the inflow flange 4 and outflow flange 6 differs from the embodiment shown in FIGS. 1 to 12. Otherwise the embodiment shown in FIGS. 13 and 14 corresponds to the embodiment described above, and identical parts are referred to with the same reference symbols, so reference can be made to the above information in this respect.

In the embodiment shown in FIGS. 13 and 14, the housing likewise includes two grooves 42, 43 running in the flow direction A. However, instead of the two sealing bars 44 and 45, a sealing plate 70 having a rectangular outer contour is provided as the sealing element. Like the sealing bars 44, 45, the sealing plate 70 has a curved surface 46, which interacts with the sealing ring 40 and is formed by a circular-cylindrical opening 71 in the sealing plate 70. The diameter of the opening 71 is matched to the diameter of the sealing ring 40. The sealing plate 70 is planar on its other outer sides, in particular the outer sides 48 opposite the curved surface 46. To accommodate the sealing plate 70, the housing 12 has a length L, measured in the flow direction A, that is greater than the diameter of the circular outer contour of the partition 26 of the closing body 16. The length L corresponds to an edge length of the rectangular, in particular square, sealing plate 70. The partition 26 thus does not project into the inflow flange 4 and the outflow flange 6, so the partitions 10 and 52 thereof can each be planar on their side facing the closing body 16. The production of the flanges 4 and 6 is thus less complex. The closing body 16 and the sealing ring 40 arranged thereon only execute a sliding movement over the curved surface 46 of the opening 71 in the sealing plate 70 when the valve 1 opens and closes. There are no sliding movements between the outer faces 48 of the sealing plate 70 and the partitions 10 and 52 of the flanges 4 and 6.

When the valve 1 shown in FIGS. 13 and 14 is assembled, the closing body 16 with the sealing ring 40 placed thereon is inserted into the opening 71 of the sealing plate 70 and then pushed into the passage 14 in the housing 12 in the flow direction A, the sealing plate 70 being introduced into the grooves 42 and 43.

List of reference symbols

| | |
|---|---|
| 1 | Exhaust gas recirculation valve |
| 2 | Drive device |
| 4 | Inflow flange |
| 6 | Outflow flange |
| 8 | Duct |

List of reference symbols

| | |
|---|---|
| 9 | Duct |
| 10 | Partition |
| 12 | Housing |
| 14 | Passage |
| 16 | Closing body |
| 18 | Shaft |
| 19 | Rotation axis |
| 20 | Bearing |
| 21 | Bearing |
| 22 | Bore |
| 24 | Pin |
| 26 | Partition |
| 28 | Duct |
| 29 | Duct |
| 30 | Upstream section |
| 31 | Upstream section |
| 32 | Downstream section |
| 33 | Downstream section |
| 34 | Side face |
| 35 | Side face |
| 36 | Side face |
| 37 | Side face |
| 40 | Sealing ring |
| 42 | Groove |
| 43 | Groove |
| 44 | Sealing bar |
| 45 | Sealing bar |
| 46 | Curved surface |
| 48 | Outer side |
| 50 | Duct |
| 51 | Duct |
| 52 | Partition |
| 54 | End of shaft |
| 55 | End of shaft |
| 60 | Drive lever |
| 62 | Coupling member |
| 64 | Compression spring |
| 66 | Rotary spring |
| 70 | Sealing plate |
| 71 | Opening |
| A | Flow direction |
| L | Length |

What is claimed is:

1. A valve for an exhaust system of an internal combustion engine, the valve comprising:
   a housing which contains a passage for conducting exhaust gases;
   in the passage is arranged a closing body, with which the passage can be closed;
   the closing body is fastened in a rotationally fixed manner to a shaft, which is mounted rotatably in the housing, where the closing body can be pivoted together with the shaft about the rotation axis of the shaft;
   wherein the closing body has a partition which runs perpendicularly to the rotation axis of the shaft and has a circular outer contour, wherein the partition is sealed off from the housing and divides the passage into a first duct and a second duct separate from the first duct;
   wherein the closing body has a closed position, in which both ducts are closed.

2. The valve according to claim 1, wherein at least one suitable sealing element is arranged between the circular outer contour of the partition of the closing body and the housing, in order to seal off the first duct from the second duct.

3. The valve according to claim 2, wherein a sealing ring is arranged on the circular outer contour of the partition of the closing body.

4. The valve according to claim 3, wherein the sealing ring has a greater outer diameter than the closing body.

5. The valve according to claim 2, wherein a sealing element has a curved surface on its side facing the closing body, which surface interacts with the circular outer contour of the partition or a sealing ring arranged thereon.

6. The valve according to claim 5, wherein the curved surface has the shape of a circumferential surface of a circular cylinder or of a segment thereof.

7. The valve according to claim 5, wherein the sealing element is planar, at least on an outer side opposite the curved surface.

8. The valve according to claim 5, wherein the sealing element is arranged in the housing such that it can be displaced along the passage.

9. The valve according to claim 1, wherein the housing has a length, measured in the flow direction of the exhaust gas, that is smaller than the diameter of the circular outer contour of the partition of the closing body.

10. The valve according to claim 1, wherein the housing is connected to an inflow flange and/or an outflow flange, of which at least one flange has two ducts, which are separated by a second partition.

11. The valve according to claim 10, wherein the distance of the second partition of the flange, measured along the rotation axis of the shaft, from one end of the shaft corresponds to the distance of the partition of the closing body from the same end of the shaft.

12. The valve according to claim 10, wherein the second partition of the flange has the shape of a segment of a circumferential surface of a circular cylinder on the side of the second partition that faces the closing body.

13. A valve for an exhaust system of an internal combustion engine, the valve comprising:
- a housing which contains a passage for conducting exhaust gases of the internal combustion engine;
- a closing body disposed in the passage where the closing body is pivotable between an open position and a closed position, wherein in the open position the exhaust gases can pass through the passage and wherein in the closed position the exhaust gases cannot pass through the passage;
- a shaft pivotably mounted in the housing and through the closing body, where the closing body is fastened in a rotationally fixed manner to the shaft,
- and wherein the closing body and shaft can be pivoted together about a rotation axis of the shaft;
- wherein the closing body has a partition which runs perpendicularly to the rotation axis of the shaft and has a circular outer contour, wherein the partition divides the passage into a first duct and a second duct, where the first duct is separate from the second duct;
- wherein when the closing body is in the closed position both the first and second ducts are closed, and wherein when the closing body is in the open position the exhaust gases of the internal combustion engine can pass through the first and second ducts.

* * * * *